No. 876,976. PATENTED JAN. 21, 1908.
G. LACOMME.
MOUNT FOR AMUSEMENT RACE TRACKS.
APPLICATION FILED NOV. 2, 1907.
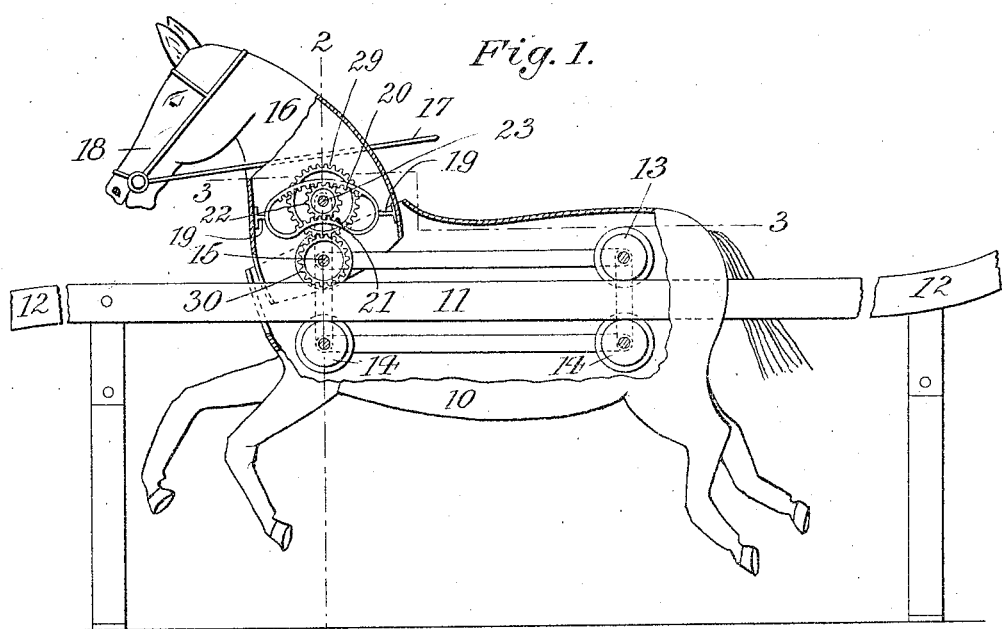
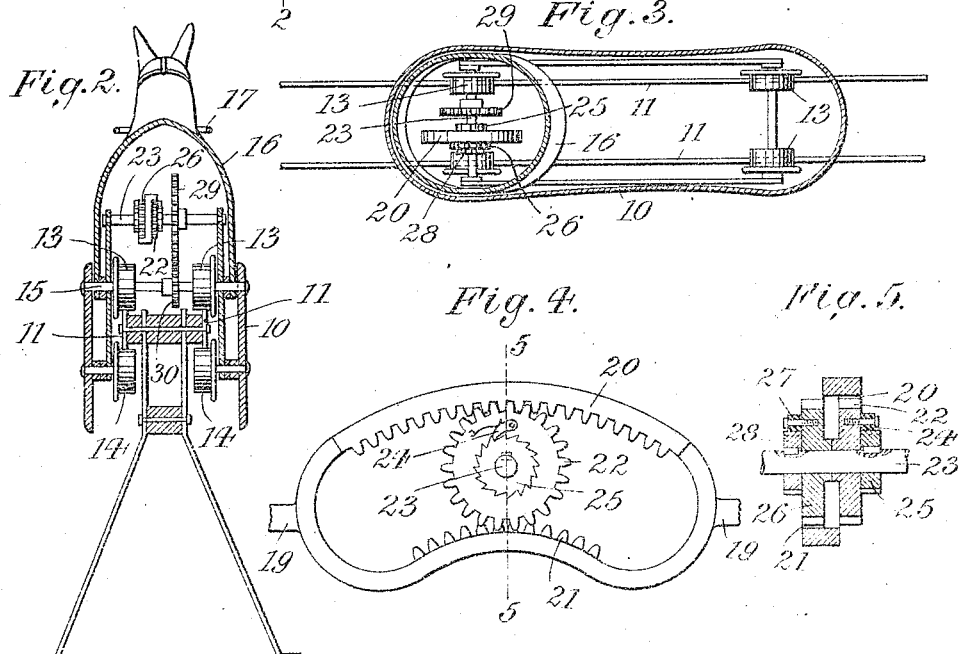

UNITED STATES PATENT OFFICE.

GASTON LACOMME, OF NEW YORK, N. Y., ASSIGNOR OF ONE-HALF TO EDWARD C. EUSTACE, OF NEW YORK, N. Y.

MOUNT FOR AMUSEMENT RACE-TRACK.

No. 876,976.　　Specification of Letters Patent.　　Patented Jan. 21, 1908.

Application filed November 2, 1907. Serial No. 400,344.

*To all whom it may concern:*

Be it known that I, GASTON LACOMME, a citizen of France, residing at New York city, Brooklyn, county of Kings, State of New York, have invented new and useful Improvements in Mounts for Amusement Race-Tracks, of which the following is a specification.

This invention relates to a mount adapted to advance by gravity along a track and provided with additional propelling means operable by the rider, so that the latter can, by his own efforts, accelerate the movement of his mount.

In the accompanying drawing: Figure 1 is a side view, partly in section, of my improved mount for amusement race tracks; Fig. 2 a vertical cross section on line 2—2, Fig. 1; Fig. 3 a horizontal section on line 3—3, Fig. 1; Fig. 4 a detail of the motion-transmitting means, and Fig. 5 a cross section on line 5—5, Fig. 4.

The body 10 of a horse or other mount is slidable upon the two rails 11 of a track having one or more inclined sections 12, so that the horse is propelled along said track by gravity. The engagement between horse and track is effected by two sets of flanged upper wheels 13 and two sets of lower wheels 14, that engage the rails at the top and bottom respectively, so that the horse is held against tilting.

Means are provided for enabling the rider to impart to the driving axle 15 of the front upper wheels 13, a rotation in addition to that imparted to such axle by the inclined sections of the track. These means are as follows: The neck 16 of the horse is fulcrumed to trunk 10 by axle 15 and may be oscillated upon such fulcrum by the rider through a rigid rein 17 secured to head 18. Within neck 16 is rigidly fitted by arms 19, a frame consisting of two racks 20, 21, curved concentrically to pivot 15. Rack 20 engages a pinion 22 loosely mounted on a counter-shaft 23 which is rotatably journaled in body 10. To pinion 22 is pivoted a spring pawl 24 engaging a ratchet wheel 25 fast on shaft 23. In like manner rack 21 engages a pinion 26 loosely mounted on shaft 23 and provided with pawl 27 engaging ratchet wheel 28, also fast on shaft 23. On the forward tilting of neck 16, rack 21 will thus impart a partial forward rotation to shaft 23, while upon the rearward tilting of the neck, a further partial forward rotation will be imparted to such shaft by rack 20, as will be readily understood. Shaft 23 is intergeared with axle 15 by wheels 29, 30, and thus the rocking movement of neck 16 will turn such axle forward, so that the rider can assist in urging his mount to the front.

It will be seen that by my invention the rider is enabled to assist gravity in the propulsion of his mount, so that besides the exhilerating automatic movement along the track, a healthful and entertaining exercise is provided.

I claim:

1. A device of the character described, comprising an inclined track, an animal figure movable thereon by gravity and having a pivoted neck, a driving axle journaled in the mount, and means for operatively connecting the pivoted neck to said axle, substantially as specified.

2. In a device of the character described, a track, combined with a body movable thereon, a member pivoted to the body, a double rack within the member, pinions engaged thereby, pawls pivoted to the pinions, ratchet wheels engaged by the pawls, a shaft to which said ratchet wheels are secured, and a driving axle within the body intergeared with said shaft, substantially as specified.

Signed by me at New York city, (Manhattan,) N. Y., this first day of November, 1907.

GASTON LACOMME.

Witnesses:
　EDWARD C. EUSTACE,
　FRANK V. BRIESEN.